United States Patent
Tiedemann, Jr. et al.

(10) Patent No.: US 6,246,673 B1
(45) Date of Patent: Jun. 12, 2001

(54) METHOD AND SYSTEM FOR HANDOFF BETWEEN AN ASYNCHRONOUS CDMA BASE STATION AND A SYNCHRONOUS CDMA BASE STATION

(75) Inventors: Edward G. Tiedemann, Jr.; Daisuke Terasawa; Sandip Sarkar; Yu-Cheun Jou, all of San Diego; Joseph P. Odenwalder, Del Mar; Abihijit Shanbhag, San Diego, all of CA (US); Serge Willenegger, Onnens (CH)

(73) Assignee: Qualcomm Inc., San Diego, CA (US)

( * ) Notice: Subject to any disclaimer, the term of this patent is extended or adjusted under 35 U.S.C. 154(b) by 0 days.

(21) Appl. No.: 09/515,042

(22) Filed: Feb. 25, 2000

Related U.S. Application Data

(60) Provisional application No. 60/122,089, filed on Feb. 26, 1999.

(51) Int. Cl.$^7$ ....................................................... H04Q 7/38
(52) U.S. Cl. ............................ 370/333; 370/335; 455/436
(58) Field of Search ..................................... 370/252, 328, 370/339, 331, 332, 335, 342, 350, 513, 514, 479; 455/436, 437, 438, 439, 442

(56) References Cited

U.S. PATENT DOCUMENTS 5,293,380 * 3/1994 Kondo .................................. 370/351
5,440,561   8/1995 Werronen .......................... 370/105.1
5,711,003 * 1/1998 Dupuy ................................. 455/436
6,018,667 * 1/2000 Ghosh et al. ....................... 455/502

FOREIGN PATENT DOCUMENTS 0873034  10/1998 (EP) .
9715160   4/1997 (WO) .
9731503   8/1997 (WO) .

OTHER PUBLICATIONS

Holcman, et al. "CDMA Intersystem Operations" Proceedings of the VTC 1994 IEEE 44$^{th}$ Vehicular Technology Conf. 1: 590–594.

* cited by examiner

Primary Examiner—Ricky Ngo
(74) Attorney, Agent, or Firm—Philip Wadsworth; Byron Yafuso (57) ABSTRACT

A method and system that enables faster acquisition of the forward link signal of a target base station in a mixed network of synchronous and asynchronous base stations is disclosed. The serving base station transmits in a neighbor list an estimated timing error 417 between the serving base station and a target base station. By utilizing the timing information, a mobile station estimates the relative time offset 408 between forward link signals received from the serving base station and signals received from the target base station. Timing information acquired during handoff enables accurate updating of the estimated timing error 417 subsequently transmitted in the neighbor lists by the base stations.

7 Claims, 9 Drawing Sheets

METHOD AND SYSTEM FOR HANDOFF BETWEEN AN ASYNCHRONOUS CDMA BASE STATION AND A SYNCHRONOUS CDMA BASE STATION

This application claims the benefit of U.S. Provisional Application No. 60/122,089, entitled "Asynchronous Operation", filed Feb. 26, 1999.

BACKGROUND OF THE INVENTION

I. Field of the Invention

The present invention relates to wireless communication systems. More particularly, the present invention relates to a novel and improved method and apparatus for performing handoff synchronization between synchronous and asynchronous base stations in a CDMA wireless communication system.

II. Description of the Related Art

Figure 1A:
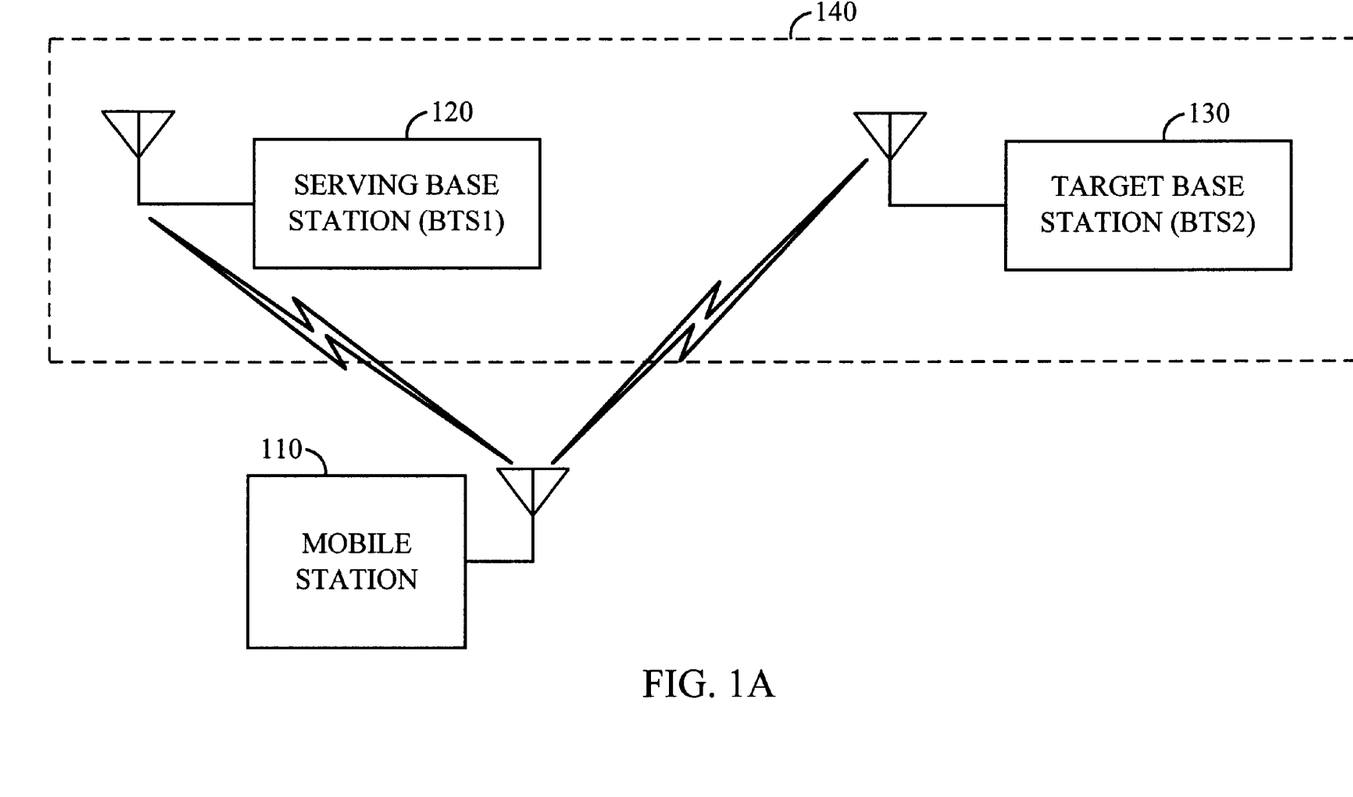
FIG. 1a is an exemplifying embodiment of a wireless communication system.

FIG. 1a is an exemplifying embodiment of a wireless communication system having a terrestrial wireless network 140 in communication with a wireless mobile station 110. Wireless network 140 is shown with two wireless base stations 120 and 130 such that mobile station 110 can communicate with either and can handoff between the two. The wireless communication channel through which information signals, travel from mobile station 110 to a base station 120 or 130 is known as a reverse link. The wireless communication channel through which information signals travel from a base station 120 or 130 to mobile station 110 is known as a forward link.

Though only one serving base station is shown, an MS may communicate with multiple serving base stations in soft handoff and may establish a handoff to multiple target base stations. Mobile station 110 communicates exclusively with one or more serving base stations 120 before handoff is established. After handoff is established, mobile station 110 may communicate in "soft handoff" with both serving base stations 120 and target base stations 130. Alternatively, following a "hard handoff," mobile station 110 communicates exclusively with target base stations 130. In reality, typical wireless communication systems may have many more mobile stations and base stations than shown. Wireless network 140 includes one or more base station controllers or BSC's (not shown) and one or more mobile switching centers or MSC's (not shown). Serving base station 120 may be connected to a different BSC and MSC than target base station 130, or the two base stations may share the same BSC and MSC.

Mobile station 110 may be any of a number of different types of wireless communication devices such as a portable phone, a wireless communication module incorporated into a portable computer, or a fixed location communication module such as might be found in a wireless local loop or meter reading system. In the most general embodiment, mobile stations may be any type of communication unit. For example, the mobile stations can be hand-held personal communication system units, portable data units such as personal data assistants, or fixed location data units such as meter reading equipment.

In an exemplary embodiment, mobile station 110 communicates with serving base station 120 and target base station 130 using code division multiple access (CDMA) techniques. An industry standard for a wireless system using code division multiple access (CDMA) is set forth in the TIA/EIA Interim Standard entitled "Mobile station—Base Station Compatibility Standard for Dual-Mode Wideband Spread Spectrum Cellular System", TIA/EIA/IS-95, and its progeny (collectively referred to herein as IS-95), the contents of which are also incorporated herein by reference. More information concerning a code division multiple access communication system is disclosed in U.S. Pat. No. 4,901,307, entitled "SPREAD SPECTRUM MULTIPLE ACCESS COMMUNICATION SYSTEM USING SATELLITE OR TERRESTRIAL REPEATERS", assigned to the assignee of the present invention and incorporated in its entirety herein by this reference.

Third-generation CDMA wireless communications systems have also been proposed. The cdma2000 ITU-R Radio Transmission Technology (RTT) Candidate Submission proposal forwarded by the Telecommunications Industry Association (TIA) to the International Telecommunication Union (ITU) for consideration for the IMT-2000 CDMA standard is an example of such a third-generation wireless communication system. The standard for cdma2000 is given in draft versions of IS-2000 and has been approved by the TIA. The cdma2000 proposal is compatible with IS-95 systems in many ways. For example, in both the cdma2000 and IS-95 systems, each base station time-synchronizes its operation with other base stations in the system. Typically, the base stations synchronize operation to a universal time reference such as Global Positioning Satellites (GPS) signaling; however, other mechanisms can be used. Based upon the synchronizing time reference, each base station in a given geographical area is assigned a sequence offset of a common pseudo noise (PN) pilot sequence. For example, according to IS-95, a PN sequence having $2^{15}$ chips and repeating every 26.67 milliseconds (ms) is transmitted as a pilot signal by each base station. The pilot PN sequence is transmitted by each base station at one of 512 possible PN sequence offsets. Each base station transmits the pilot signal continually, which enables mobile stations to identify the base station's transmissions as well as for other functions.

In addition to the pilot PN sequence, each base station in an IS-95 system transmits a "sync channel" signal that is synchronized to the pilot PN signal. The sync channel contains information such as the PN offset of the base station and the CDMA System Time used by the base station. When an IS-95 mobile station first powers on, it must obtain the CDMA System Time from an IS-95 base station before it can communicate with any synchronous base station. To obtain CDMA System Time, an IS-95 mobile station performs a two-step acquisition procedure. First, the mobile station performs a full search for the pilot PN sequence transmitted by any synchronous base station. This search may be performed over the entire 26.67 millisecond pilot PN code space. Upon locating a pilot PN signal, the mobile station then decodes a sync channel message from that base station's sync channel. Once a mobile station successfully reads the sync channel, the mobile station has a reference CDMA System Time that is accurate to within the time it takes for the base station's signal to reach the mobile station. Because this time is dependent on the unknown length of the signal propagation path between the mobile station and the base station, it is called the path delay uncertainty. Because the path delay uncertainty is very small compared to the 512 possible pilot PN offsets used in IS-95, the mobile station can unambiguously distinguish signals transmitted by different base stations by their PN offsets.

Base station time-synchronization as provided in the cdma2000 and IS-95 systems has many advantages with respect to system acquisition and handoff completion time. Synchronized base stations and time-shifted common pilot signals as discussed above permit a fast one-step correlation for system acquisition and detection of neighboring base stations. Once the mobile station has acquired one base station, it can determine system time that is the same for all neighboring synchronous base stations. In this case, there is no need to adjust the timing of each individual mobile station during a handoff between synchronous base stations. Additionally, the mobile station does not need to decode any signal from the new base station in order to obtain rough timing information prior to handing off.

Another recently-proposed 3G communication system is referred to as W-CDMA. One example of a W-CDMA system is described in the ETSI Terrestrial Radio Access (UTRA) International Telecommunications Union (ITU) Radio Transmission Technology (RTT) Candidate Submission forwarded by ETSI to the ITU for consideration for the IMT-2000 CDMA standard. The base stations in a W-CDMA system operate asynchronously. That is, the W-CDMA base stations do not all share a common universal time reference. Different base stations are not time-aligned. Consequently, a W-CDMA base station may not be identified by its pilot signal offset alone. Also, once the system time of one base station is determined, this cannot be used to estimate the system time of a neighboring base station. For this reason, mobiles in a W-CDMA system use a three-step PERCH acquisition procedure to synchronize with each base station in the system. Each step in the acquisition procedure identifies a different code within a frame structure called a PERCH channel.

Figure 1B:
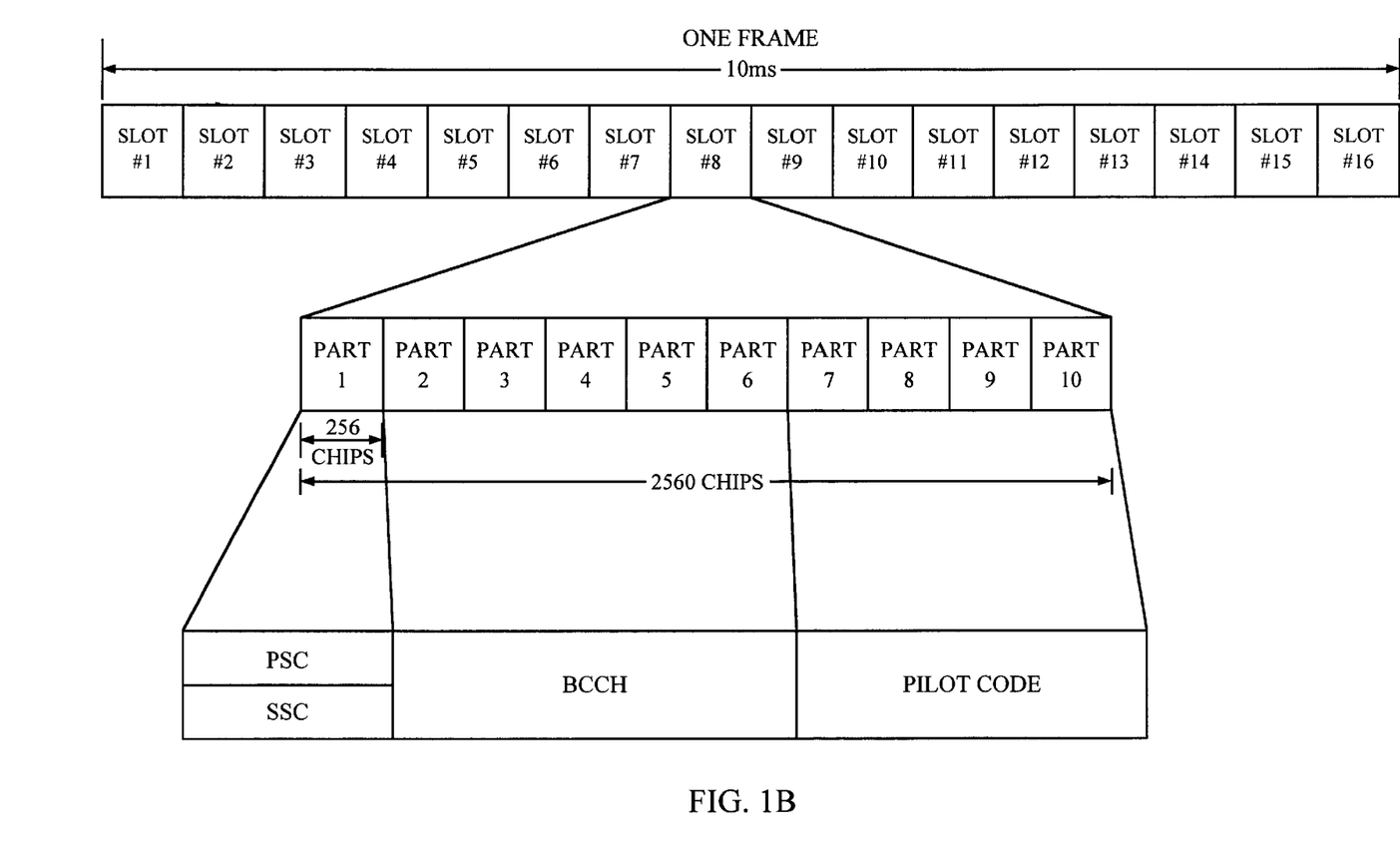
FIG. 1b illustrates the parts of a frame transmitted on a W-CDMA PERCH channel.

FIG. 1b illustrates the parts of a frame transmitted on the W-CDMA PERCH channel. The PERCH channel is transmitted by each base station in a W-CDMA communication system and permits mobile stations to acquire synchronization with each base station. A frame is 10 milliseconds in duration and consists of 40,960 chips. A frame is divided into 16 slots, each slot having 2560 chips. Each slot can then be thought of as being divided into 10 consecutive parts, each part consisting of 256 chips. For the purposes of this disclosure, the 10 parts of each slot are numbered from 1 to 10, with 1 being the earliest transmitted 256 chips of each slot.

The first 256 chips (part 1) of each slot in the frame consist of two synchronization codes transmitted simultaneously. The first of the two codes is the primary synchronization code (PSC) sequence. The PSC sequence is the same sequence of 256 chips for every slot and for every base station in a W-CDMA system. The second of the codes transmitted in part 1 is the secondary synchronization code (SSC). The SSC sequences identify the timing of the parts in each slot, as well as the code group to which the transmitting base station belongs.

Parts 2 through 6 of each slot include broadcast data such as the system identity of the transmitting base station and other information that is of general use to all mobile stations in communication with that base station. Parts 7 through 10 of each slot are used to carry a pilot code signal that is generated in accordance with an Orthogonal Gold code as defined by the aforementioned UTRA specification.

Mobile stations in a W-CDMA system employ a 3-step acquisition procedure, in which each step requires multiple parallel correlations to identify the timing of different synchronization codes. The mobile station first synchronizes to the PSC to identify the boundaries between the different parts of each slot. Second, once the boundaries between parts have been identified, the mobile station uses the timing information derived from the primary synchronization channel to derive slot timing information and a Group ID from the secondary synchronization channel. Third, the mobile station decodes the pilot code signal in order to determine the identity of the transmitting base station and to identify the boundaries between frames. Once this process is complete, the mobile station may also be required to decode information from the broadcast channel (BCCH) to unambiguously determine the system time of the transmitting base station. The BCCH transmits timing information that can be used to identify the W-CDMA frame number. Because the frame boundaries are aligned with W-CDMA System Time, the W-CDMA frame number combined with the frame timing information can be used to determine the W-CDMA System Time of a W-CDMA base station.

Recently, a combined CDMA IMT-2000 standard has been proposed in which cdma2000-compliant equipment and W-CDMA-compliant equipment may be optionally supported by any manufacturer. Thus, it is expected that synchronous base stations of a cdma2000-compliant system will be geographically located near asynchronous base stations of a W-CDMA-compliant system. This creates a need to be able to handoff a mobile station that supports both cdma2000 and W-CDMA operation between the asynchronous base stations of a W-CDMA system and the synchronous base stations of a cdma2000 system, and vice versa.

U.S. Pat. No. 5,267,261 entitled "MOBILE STATION ASSISTED SOFT HANDOFF IN A CDMA CELLULAR COMMUNICATIONS SYSTEM," which is assigned to the assignee of the present invention and which is incorporated herein, discloses a method and system for providing communication with the mobile station through more than one base station during the handoff process. Further information concerning handoff is disclosed in U.S. Pat. No. 5,101,501, entitled "METHOD AND SYSTEM FOR PROVIDING A SOFT HANDOFF IN COMMUNICATIONS IN A CDMA CELLULAR TELEPHONE SYSTEM", U.S. Pat. No. 5,640,414, entitled "MOBILE STATION ASSISTED SOFT HANDOFF IN A CDMA CELLULAR COMMUNICATIONS SYSTEM", and U.S. Pat. No. 5,625,876 entitled "METHOD AND APPARATUS FOR PERFORMING HANDOFF BETWEEN SECTORS OF A COMMON BASE STATION," each of which is assigned to the assignee of the present invention and incorporated in its entirety herein by this reference. The subject matter of U.S. Pat. No. 5,625,876 concerns so-called "softer handoff." For the purposes of this document, the term "soft handoff" is intended to include both "soft handoff" and "softer handoff."

Each base station is associated with a set of neighboring base stations surrounding the base station. Due to the physical proximity of the coverage areas of the neighboring base stations to the coverage area of the active base station, the mobile stations which are communicating with the active base station are more likely to handoff to one of the neighboring base stations than to other base stations in the system. In the IS-95 and cdma2000 systems, the base station identifies the neighboring base stations to the mobile stations with which it has established communication using a neighbor list message. The neighbor list message identifies a neighboring base station according to the PN sequence offset at which it transmits the pilot signal. In the IS-95 and cdma2000 systems, there is a one-to-one correspondence in a given geographical area between a base station and a PN sequence offset. In other words, two base stations operating in the same geographical area do not both use the same PN sequence offset. Thus, a base station in the IS-95 or cdma2000 system can be uniquely identified in a geographical region by its PN sequence offset.

The mobile station uses the neighbor list to limit the space over which it searches for handoff candidates. Because the searching process is so resource intensive, it is advantageous to avoid performing a search over the entire set of possible PN sequence offsets. By using the neighbor list, the mobile station can concentrate its resources on those PN sequence offsets which are most likely to correspond to useful signal paths.

A typical IS-95 or cdma2000 neighbor acquisition operation is practical so long as each base station's timing remains synchronous with respect to the others. However, in some systems such as W-CDMA, advantages are achieved by decoupling operation of the system from a synchronizing reference. For example, in a system which is deployed underground, such as in a subway system, it can be difficult to receive a universal time synchronization signal using GPS. Even where strong GPS signals are available, it is perceived as desirable in some political climates to decouple system operation from the U.S. Government GPS system. There may be other reasons for decoupling operation of the system from a synchronizing reference.

In a system where one or more of the base stations operate asynchronously with respect to other base stations in the system, the base stations cannot be readily distinguished from one another based merely upon a relative time offset (typically measured as a relative PN sequence offset) because a relative time offset between the base stations cannot be established without the use of a universal time reference. Thus, when a mobile station is in communication with an asynchronous base station, and has not been recently in communication with a synchronous base station, the mobile station is unlikely to have system time information of the synchronous base stations to a sufficient accuracy.

For example, suppose a mobile station has been in the coverage area of an asynchronous base station and is moving into the coverage area of a synchronous base station. Further suppose that the mobile station is able to detect the pilot signals of two different synchronous base stations by determining their relative PN sequence offsets. Unless the mobile station already knows system time of the synchronous base stations to a sufficient accuracy, the mobile station may not be able to distinguish the pilot signal of one base station from the pilot signal of another. For example, even if the mobile station can determine the received pilot signals belong to two synchronous base stations, the mobile station may be unable to identify either based on their pilot signals alone.

In a conventional IS-95 or cdma2000 system, once the forward pilot channel is acquired, the mobile station can then demodulate the forward synchronization channel. This is possible because the forward sync channel timing is such that its frame boundary is always aligned to the beginning of the PN sequence of the forward pilot channel. In other words, the forward sync channel frame boundary is always offset from system time by the same number of PN chips as the PN sequence offset of the corresponding forward pilot channel. The forward sync channel carries a sync channel message which includes overhead information such as system identification, system time, the base station's PN sequence offset, and several other items of useful information. After demodulating the sync channel message, the mobile station adjusts its internal timing according to the PN offset and system time sent in the sync channel message as described in IS-95.

The conventional sync channel is transmitted at a low data rate (for example, 1200 bps in IS-95), and the sync channel message contains a large amount of overhead information that must be demodulated on a frame-by-frame basis. Consequently, determining the system identity of the transmitting base station via the sync channel message may take as long as 800 milliseconds. This delay can undesirably affect the timing of a handoff from the asynchronous base station to the synchronous base station, particularly in a fading environment. In some instances, the delay associated with the mobile station having to determine the system identification of the synchronous target base station(s) by demodulating a conventional sync channel message would be unacceptably long, causing degradation or even dropping of a call in progress.

In a cdma2000 system, a mobile station communicating with a serving base station can quickly and efficiently search for signals of neighboring base stations. Once a mobile station receives a neighbor list message from the serving base station, the mobile station can determine a time offset search window within which the signal transmitted from a target base station will arrive at the mobile station. Because the width of the search window is roughly proportional to the average time needed to locate a signal within the window, a narrow search window is preferable to a wide search window. In a cdma2000 system, the narrowness of the search window is limited only by the relatively small path delay uncertainty between the mobile station and the two different base stations. Additionally, once the mobile station in a cdma2000 system finds the signal of the target base station within the search range, the mobile station can uniquely identify the target base station by its PN offset.

In contrast, in a W-CDMA system in which the base stations may not be synchronized with each other, a mobile station cannot use timing information from a serving base station to accurately predict the arrival time of a signal from a target base station. In order to locate the signal of an unsynchronized target base station, a W-CDMA mobile station must perform the full three-step PERCH acquisition procedure described above. This acquisition procedure takes substantially longer than searching within a narrow window for a cdma2000 signal, and therefore increases the time required to establish a handoff in a W-CDMA system.

In the worst case, the timing of different W-CDMA base stations may vary so widely that the mobile station will not know the transmit frame number of the target base station even after performing the three-step PERCH acquisition procedure. This ambiguity can occur if the base stations within the W-CDMA wireless system might be as much as a half-frame period out of synchronization. In such a system, the mobile station must monitor information transmitted on the target base station's broadcast channel to identify the frame number of the target base station. This extra decoding step further increases the time required to establish a handoff in a W-CDMA system.

The lack of synchronization in asynchronous systems such as W-CDMA systems presents difficulties in establishing handoff between synchronous and asynchronous base stations. Such problems arise when a mobile station is located in a region that lies within the coverage area of both synchronous and asynchronous wireless systems. Such a region can exist along the border between a synchronous and an asynchronous system, or may exist throughout a coverage area serviced by overlapping synchronous and asynchronous wireless systems, such as W-CDMA and cdma2000 systems.

In order to perform handoff from an asynchronous system to a synchronous system, a mobile station must hand off from an asynchronous base station to a synchronous base station. Because the asynchronous serving base station, unlike the synchronous target base station, is not synchronized to a universal time reference, the asynchronous base station cannot provide timing information for the target base station to the mobile station. In the absence of timing information for the synchronous target base station, the mobile station must perform a full pilot search and then read the sync channel in order determine the system timing of the target base station. Performing a full pilot search and reading the sync channel of the target base station is undesirable, because it increases the time required to establish a handoff.

In order to perform handoff from a synchronous system to an asynchronous system, a mobile station must hand off from a synchronous base station to an asynchronous base station. Because the asynchronous target base station, unlike the synchronous serving base station, is not synchronized to a universal time reference, the synchronous base station cannot provide timing information for the target base station to the mobile station. In the absence of timing information for the asynchronous target base station, the mobile station must perform the full three-step PERCH acquisition procedure to determine frame timing of the asynchronous target base station. In order to find the full system time of the asynchronous base station, the mobile station must then read the broadcast channel information transmitted by the asynchronous target base station. Performing the three-step PERCH acquisition procedure and reading the broadcast channel of the target base station is undesirable, because it increases the time required to establish a handoff.

Thus, there is a need for an improved method and system for facilitating handoff between asynchronous and synchronous base stations that avoids the undesirable delays associated with determining the system time of the target base station.

SUMMARY OF THE INVENTION

An aspect of the present invention enables faster determination of system timing of a target base station in a mixed network of synchronous and asynchronous base stations. By utilizing information about the relative timing between synchronous and asynchronous base stations, a mobile station determines the system time of the target base station in an advantageously short time. Handoff of a mobile station from an asynchronous serving base station to a synchronous target base station is accomplished without performing a full pilot search for the target base station and without decoding a full sync channel packet. Handoff of a mobile station from a synchronous serving base station to an asynchronous target base station is accomplished without performing a full three-step PERCH acquisition procedure for the target base station and often without decoding information from the broadcast channel.

An aspect of the present invention utilizes knowledge that asynchronous base stations within a single wireless network may be synchronized to each other. Also, the oscillators in the asynchronous network are expected to be very stable in relation to the universal time reference used in synchronous wireless networks. In other words, any difference between the system time of an asynchronous base station and the system time of a synchronous base station remains nearly constant over short periods.

The timing of asynchronous base stations relative to each other and relative to neighboring synchronous base stations may be measured every time a mobile station establishes a handoff between them. As long as handoffs between asynchronous and synchronous base stations occur frequently compared with the drift characteristics of oscillators within the asynchronous base stations, an accurate estimate of the relative system timing between the base stations can be maintained.

If handoff between base stations in a completely asynchronous network occurs often enough, the asynchronous base stations may also be kept nearly synchronized with each other. In a similar fashion, frequent handoffs between the base stations of a synchronous network and an asynchronous network may enable all of the asynchronous base stations to maintain system timing that is very near the timing provided by the universal time reference used by the synchronous network. U.S. Pat. No. 5,872,774, entitled "MOBILE STATION ASSISTED TIMING SYNCHRONIZATION IN A CDMA COMMUNICATION SYSTEM," hereinafter referred to as the '774 patent, assigned to the assignee of the present invention and incorporated by reference herein, discloses an exemplary method of utilizing handoffs to synchronize base stations to each other without the use of a universal time reference. The techniques disclosed in the '774 patent may be used to synchronize synchronous base stations to each other or to synchronize asynchronous base stations to each other. In addition, the techniques disclosed in the '774 patent may be used to synchronize the base stations of an asynchronous network to the base stations of a neighboring synchronous network.

Even without using the techniques disclosed in the '774 patent, timing information gathered by base stations communicating with a common mobile station may be used to very accurately estimate the relative system time used by each of those base stations. If the difference in system time between an asynchronous base station and a synchronous base station is very small or is known to within a great degree of accuracy, a mobile station may use the system time of the serving base station to accurately estimate the phase of the forward link signal received from the target base station. This is true whether establishing handoff from a synchronous base station to an asynchronous base station or vice versa.

The accurate estimation of the timing of the target base station's forward link signal enables the mobile station to quickly and efficiently search for the forward link signal of the target base station and to then unambiguously determine the system time of the target base station. If the target base station is synchronous the mobile station acquires the target base station's forward link signal and system timing without performing a full pilot search and without reading the sync channel message. If the target base station is asynchronous, then the mobile station acquires the target base station's forward link signal and system timing without performing a full pilot search and without reading the sync channel message.

BRIEF DESCRIPTION OF THE DRAWINGS

The features, objects, and advantages of the present invention will become more apparent from the detailed description set forth below when taken in conjunction with the drawings in which like reference characters identify correspondingly throughout and wherein.

DETAILED DESCRIPTION OF THE PREFERRED EMBODIMENTS

Figure 2:
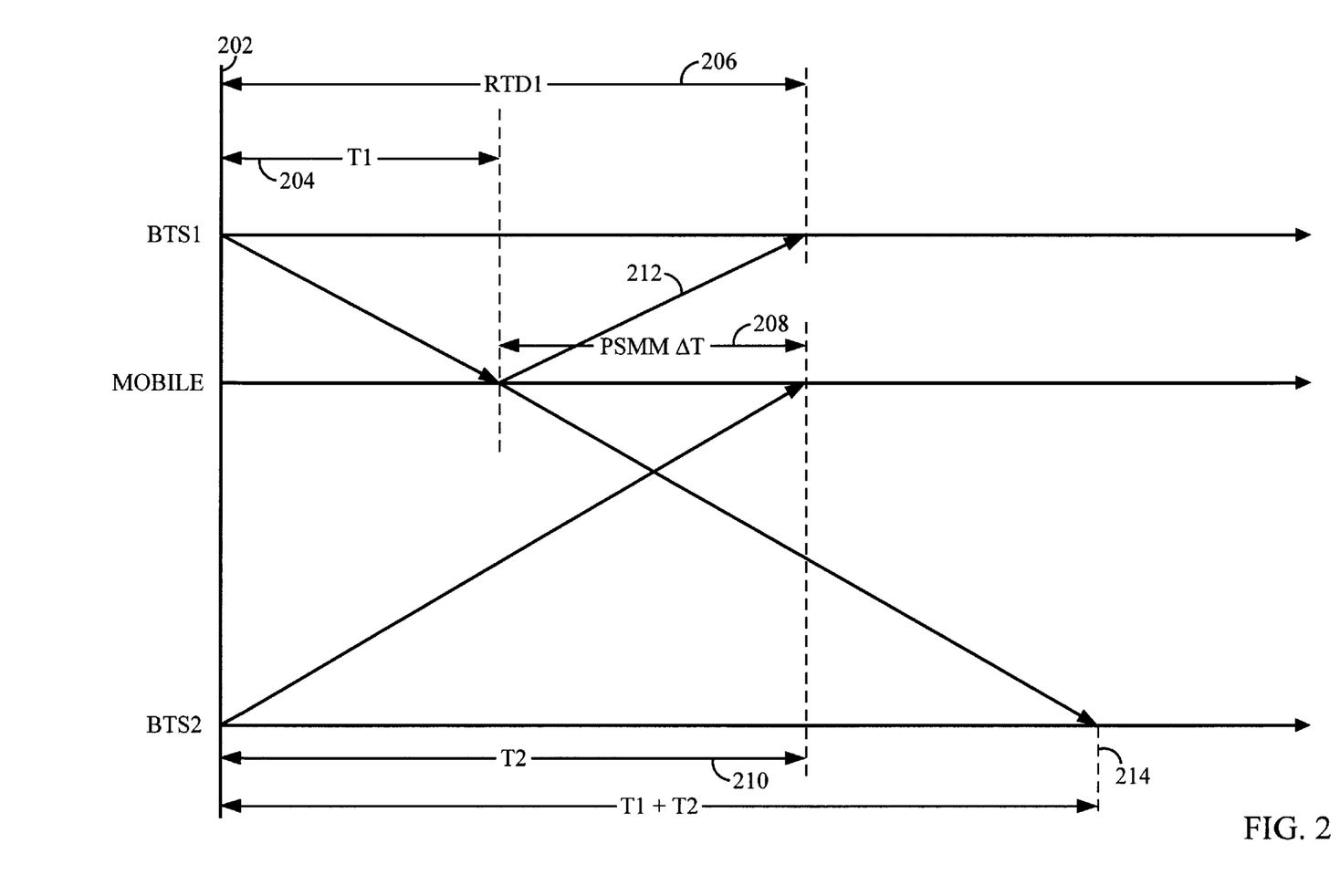
FIG. 2 is a diagram showing the timing associated with performing handoff of a mobile station from a synchronous serving base station to a synchronous target base station.

FIG. 2 is a diagram showing the timing associated with performing handoff of a mobile station (MS) between a first synchronous base station (BTS1) and a second synchronous base station (BTS2). In an exemplary embodiment, the handoff may be a "hard" handoff, in which the MS does not receive information from BTS1 once a communication link has been established with BTS2. More advantageously, the handoff is a "soft" handoff, in which the MS receives signals from both BTS1 and BTS2 simultaneously once a handoff is established.

Though only one serving base station is shown, an MS may communicate with multiple serving base stations in soft handoff and may establish a handoff to multiple target base stations. In an exemplary embodiment, both BTS1 and BTS2 are synchronized to an external time reference, for example GPS. Each of BTS1 and BTS2 uses the external time reference to establish a CDMA System Time. BTS1 establishes a BTS1 CDMA System Time, and BTS2 establishes a BTS2 CDMA System Time. Because both BTS's use the same time reference 202, the BTS1 CDMA System Time will be the same as BTS2 CDMA System Time. The CDMA System Time used by the synchronous base stations is referred to herein as Synchronous CDMA System Time.

During acquisition of the forward link signal of a serving base station (BTS1), the mobile station establishes an MS CDMA System Time based on timing information within the BTS1 forward link signal. Due to the forward link propagation delay of signals transmitted by BTS1 to the MS, the MS CDMA System Time used by the MS lags behind the Synchronous CDMA System Time. The lag time between the MS CDMA System Time and Synchronous CDMA System Time is equal to the one-way propagation delay in the signal (Ti) 204.

The PN phase of reverse link signals transmitted by the MS are aligned with MS CDMA System Time. BTS1 measures the PN phase of the reverse link signals 212 received from the MS and uses the reverse link PN phase to determine the round-trip delay time (RTD1) 206 between BTS1 and the MS. Once RTD1 206 is known, then T1 204 is known to be half of RTD1 206.

In an exemplary embodiment, the MS may receive forward link signals from multiple base stations. For example, if the MS is in a handoff region between BTS1 and BTS2, the MS will receive forward link signals from both base stations. In an exemplary embodiment, the serving base station (BTS1) sends a Neighbor List of nearby "neighbor base stations" to the MS. The Neighbor List includes identifying characteristics of the forward link signal of each neighbor base station. In an exemplary embodiment, the Neighbor List contains a pilot signal offset for each base station in the Neighbor List that the MS can use to distinguish forward link signals emanating from any base station in the Neighbor List.

With the information in the Neighbor List, the MS searches for and identifies the forward link signals of other base stations such as BTS2. The MS also measures the relative timing of the received forward link signal from BTS2 as compared to the forward link signal from BTS1. Differences in relative timing are due to differences in signal path length between the MS and each base station. In an exemplary embodiment, the MS measures the relative phase of pilot signals transmitted by BTS1 and BTS2 to determine the relative timing of the signals received from both base stations. The MS measures the difference in CDMA System Time indicated by the phase difference between the pilot signals transmitted by BTS1 and BTS2. In an exemplary embodiment, the MS sends a Pilot Strength Measurement Message (PSMM) to the serving base station (BTS1) indicating the phase difference between the BTS1 and BTS2 pilot signals received at the MS. The phase difference is used by the wireless network to determine the time difference ($\Delta T$) 208 between arrival at the MS of forward link signals transmitted simultaneously from BTS1 and BTS2. Using this information, the wireless network can then determine the one-way propagation delay from BTS2 to the MS (T2) 210. In an exemplary embodiment, T2 is determined using the equation:

$$T2 = T1 + \Delta T$$

where T1 is the propagation delay from the MS to BTS1 204, T2 is the one-way propagation delay from the MS to BTS2 210, and $\Delta T$ is the time difference between arrival at the MS of forward link signals transmitted simultaneously from BTS1 and BTS2 210.

In an exemplary embodiment, BTS1 and BTS2 can adjust the phase of their transmissions of forward link frames in 1.25 millisecond steps called frame offsets. All forward link traffic channel frames from BTS2 to the MS are transmitted using the same frame offset as used by BTS1.

In an exemplary embodiment, the MS transmits reverse link frames at specific time intervals according to MS CDMA System Time. The wireless network knows these intervals, and uses that timing information and reverse link frame timing from BTS1 to predict the arrival time 214 of reverse link frames at the receiver in BTS2. For example, if a frame transmitted by the MS arrives at BTS1 at time T, then the same frame will arrive at BTS2 at time T+$\Delta T$. Once reverse link frame timing has been determined, BTS2 can easily and efficiently search for the reverse link signal transmitted by the MS.

Figure 3:
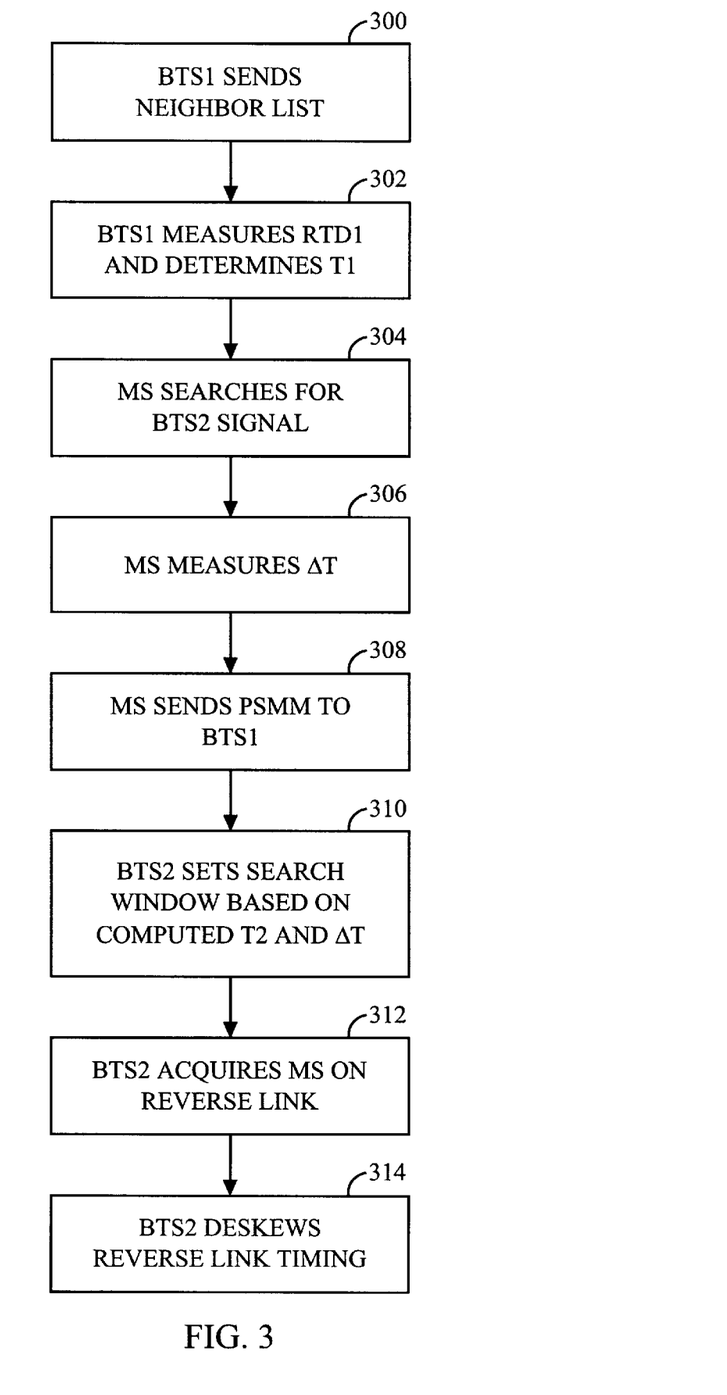
FIG. 3 is a flowchart showing the steps of an exemplary method of establishing handoff of a mobile station from a synchronous serving base station to a synchronous target base station.

FIG. 3 is a flowchart showing the steps of an exemplary method of establishing handoff of a mobile station from a synchronous serving base station (BTS2) to a synchronous target base station (BTS1). In an exemplary embodiment, both synchronous base stations (BTS1 and BTS2) are synchronized to a common universal time reference. Some time after establishing a link between BTS1 and the MS, BTS1 sends a Neighbor List to the MS at step 300. As described above, the Neighbor List includes identifying characteristics of the forward link signal of each neighbor base station. At step 302, BTS1 measures RTD1 (206 in FIG. 2) to determine T1 (204 in FIG. 2). At step 304, the MS searches for a pilot signal that has the PN offset associated with BTS2. The width of the search window used by the MS is derived from the path delay uncertainty. At step 306, the MS acquires the pilot signal from BTS2 and measures the relative signal phase of the forward link signal received from BTS2 as compared with the signal phase of the forward link signal received from BTS1. The relative PN signal phases may be used by the synchronous network to determine ΔT (208 in FIG. 2). At step 308, the MS sends the comparative signal phase information measured at step 306 to BTS1 in a Pilot Strength Measurement Message (PSMM).

In an exemplary embodiment, BTS2 then begins transmitting forward link frames to the MS using the same frame offset used by BTS1. At step 310, BTS2 sets its search window based on the estimated arrival time of reverse link signals transmitted by the MS. The wireless network can send a handoff direction message to the MS either before BTS2 begins transmitting or after BTS2 begins transmitting. If the handoff direction message is sent after BTS2 begins transmitting, then the handoff direction message is preferably transmitted from both BTS1 and BTS2. The estimated arrival time is determined by adding ΔT (208 in FIG. 2) to the measured arrival time of MS transmissions at BTS1. At step 312, BTS2 acquires the reverse link signal transmitted by the MS. Then, at step 314, BTS2 adjusts (deskews) its reverse link demodulation timing according to any differences between the estimated arrival time mentioned above and the actual arrival time of reverse link signals from the MS.

Figure 4:
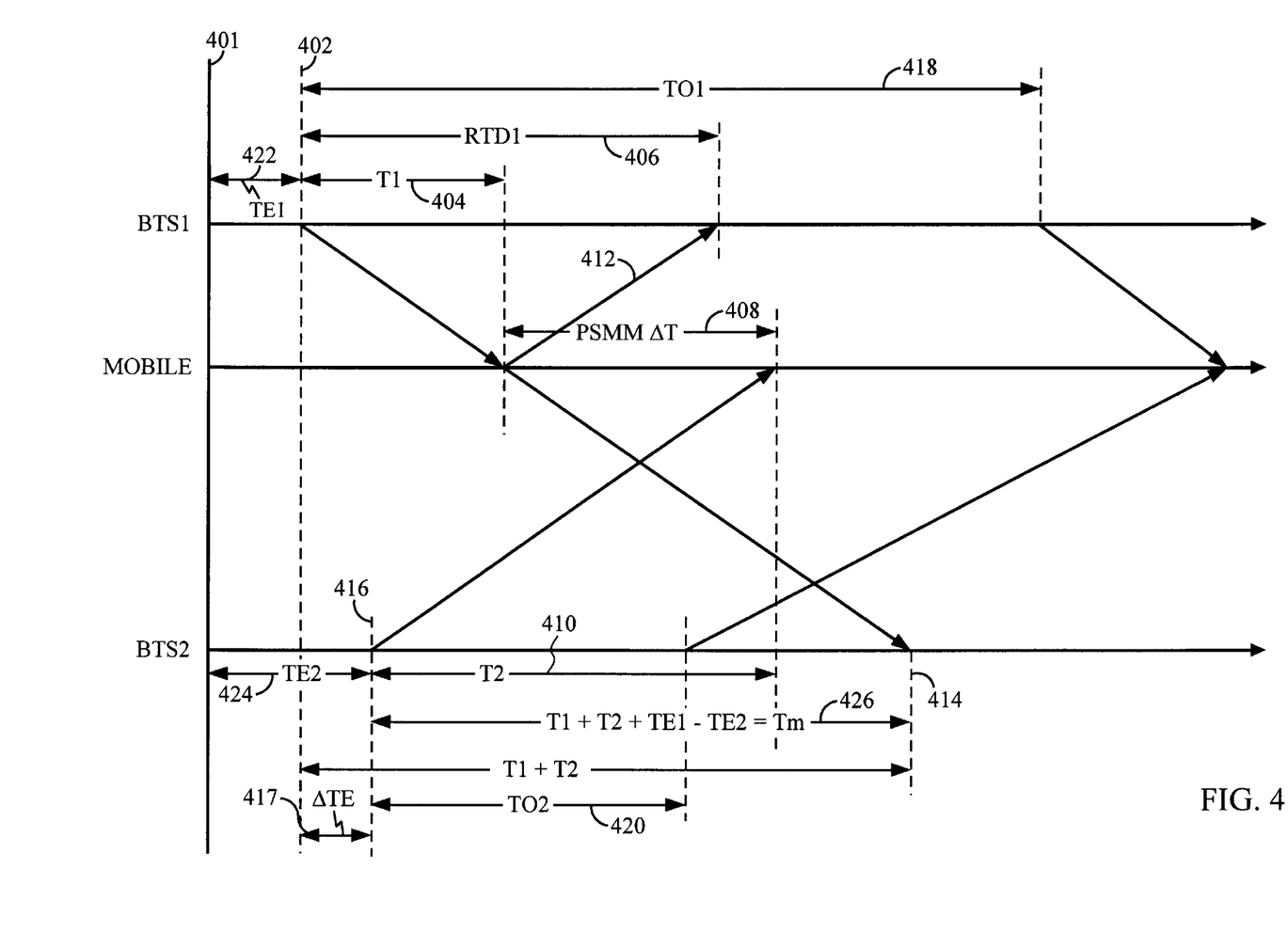
FIG. 4 is a diagram showing the timing associated with performing handoff of a mobile station from a serving base station to an asynchronous target base station.

FIG. 4 is a diagram showing the timing associated with performing handoff of a mobile station (MS) from a serving base station (BTS1) to an asynchronous target base station (BTS2). The handoff may be a hard handoff or a soft handoff. Though only one serving base station is shown, an MS may communicate with multiple serving and base stations in soft handoff and may perform handoff to multiple target base stations.

In FIG. 4, the CDMA System Time used by each base station BTS1 and BTS2 is shown as offset from a universal time reference 401. The CDMA System Time used by BTS1 is called BTS1 CDMA System Time, and is offset from universal time reference 401 by a timing error TE1 422. The CDMA System Time used by BTS2 is called BTS2 CDMA System Time, and is offset from universal time reference 401 by a timing error TE2 424. The difference in CDMA System Times between the two base stations (ΔTE) 417 is equal to TE1-TE2 and is called the relative timing error of BTS2 in relation to BTS1.

In an exemplary embodiment, BTS2 is asynchronous and BTS1 may be synchronous or asynchronous. If BTS1 is synchronous, then TE1 will equal zero. If BTS1 is asynchronous, then TE1 will generally not equal zero. In either case TE2 424 and ΔTE 417 will generally not be zero.

In an exemplary embodiment, timing information gathered during handoffs is used to maintain estimates of TE1 422, TE2 424, and ΔTE 417. Because of drift in the oscillators in an asynchronous base station, the timing error estimates can be expected to become steadily less accurate after they are measured during handoffs. In other words, as more time passes after ΔTE 417 is measured in a handoff, the estimate of ΔTE 417 can be expected to grow less reliable. In an exemplary embodiment, each base station maintains timing error estimates for all its neighbor base stations and transmits the timing errors and expected timing error accuracies in periodically broadcast Neighbor Lists.

During acquisition of the forward link signal of a serving base station (BTS1), the mobile station establishes an MS CDMA System Time based on timing information within the BTS1 forward link signal. Because of the propagation delay in the forward link channel from BTS1 to the MS, the MS CDMA System Time used by the MS will lag behind BTS1 CDMA System Time. The lag time between the MS CDMA System Time and BTS1 CDMA System Time is equal to the one-way propagation delay in the signal (T1) 404.

The PN phase of reverse link signals transmitted by the MS are aligned with MS CDMA System Time. BTS1 measures the PN phase of the reverse link signals 412 received from the MS and uses the reverse link PN phase to determine the round-trip delay time (RTD1) 406 between BTS1 and the MS. Once RTD1 406 is known, then T1 404 is known to be half of RTD1 406.

In an exemplary embodiment, the serving base station (BTS1) sends a Neighbor List of nearby "neighbor base stations" to the MS. The Neighbor List includes identifying characteristics of the forward link signal of each neighbor base station. For an asynchronous neighbor base station such as BTS2, the Neighbor List includes such information as pilot code, an estimate of ΔTE 417, and the expected accuracy of the ΔTE estimate. The Neighbor List may also include path delay uncertainty information.

In an alternate embodiment, each asynchronous base station periodically adjusts its CDMA System Time after performing a handoff with a "master" base station as described in the aforementioned '774 patent. After performing each such adjustment, the asynchronous base station adds an offset to each timing error estimate in its broadcast Neighbor List.

If the estimate of ΔTE 417 for BTS2 in the Neighbor List is known to be accurate, such as when it has been updated recently, the MS does not perform the full three-step PERCH acquisition procedure. For example, if the inaccuracy of the ΔTE estimate is less than half of a 10-millisecond frame, then the MS can search for the pilot code of BTS2 within a search window based on the inaccuracy of the ΔTE estimate. Alternatively, the MS can search for the primary synchronization code (PSC) or the secondary synchronization code (SSC) in order to determine frame timing. The MS may additionally use the path delay uncertainty of the system to determine the width of the search window used to search for the PSC, SSC, or pilot code of BTS2.

If no estimate of ΔTE 417 is available for BTS2, or if it is not known to within a half of a frame, then the MS must perform a full three-step PERCH acquisition procedure to identify the signal transmitted by BTS2. If, after performing the three-step PERCH acquisition procedure, BTS2 CDMA System Time is ambiguous, then the MS must read the broadcast channel of BTS2 to determine BTS2 CDMA System Time.

In an exemplary embodiment, the MS then sends a Pilot Strength Measurement Message (PSMM) to the serving base station (BTS1). The PSMM indicates the strength of the signal received from BTS2 and the difference 408 between BTS1 CDMA System Time and BTS2 CDMA System Time as measured at the MS.

Because the (ΔTE) 417 is not known, the one-way propagation delay from BTS2 to the MS (T2) 410 can only be estimated from T1 404 and ΔT 408. However, an offset TO2 420 can be accurately determined that will enable BTS2 to transmit forward link frames such that they arrive at the MS at approximately the same time as frames transmitted from BTS1. In an exemplary embodiment, the BTS2 forward link frame offset TO2 420 is determined using the equation:

$$TO2 = TO1 - \Delta T$$

where TO1 418 is the forward link frame offset used by BTS1, TO2 420 is the forward link frame offset used BTS2, and ΔT is the time offset 408 between BTS1 CDMA System Time and BTS2 CDMA System Time measured at the MS.

In an exemplary embodiment, BTS2 is an asynchronous base station and can adjust its forward link frame offset TO2 420 to relatively fine resolution compared to the 1.25 millisecond increments used by IS-95 synchronous base stations. For example, asynchronous base station BTS2 may be able to adjust its forward link frame offset TO2 420 in increments of one Walsh symbol of 64 chips (15.6 microseconds at 4.096 megachips-per-second). BTS2 transmits forward link frames to the MS using offset TO2 420.

In an exemplary embodiment, the MS begins demodulating the forward link signal from BTS2 after receiving a handoff direction message from BTS1. BTS2 may begin transmitting forward link frames to the MS either before or after the handoff direction message is transmitted without departing from the described method.

Because the T2 410 is not accurately known, the time that reverse link frames transmitted by the MS will arrive at BTS2 can only be approximated. In order to acquire the reverse link signal from the MS, BTS2 searches for the reverse link signal within an estimated search window. The width of the estimated search window is based on the path delay uncertainty. The location of the estimated search window is based on the measured RTD1 406.

As described above, the MS transmits its reverse link signals using a PN phase that is aligned with MS CDMA System Time. Once BTS2 acquires the reverse link signal from the MS, BTS2 measures difference Tm 426 between BTS2 CDMA System Time 416 and the MS CDMA System Time of the reverse link signal as measured at the receiver of BTS2 414. The wireless network can then determine the difference ΔT 417 between BTS1 CDMA System Time 402 and BTS2 CDMA System Time 416. ΔT 417 may be determined according to the equation:

$$\Delta TE = T1 + \frac{\Delta T - Tm}{2}$$

where ΔTE is the timing error between BTS1 CDMA System Time 402 and BTS2 CDMA System Time 416, T1 404 is the one-way propagation delay from BTS1 to the MS, ΔT is the time offset 408 between BTS1 CDMA System Time and BTS2 CDMA System Time measured at the MS, and Tm is the difference 426 between BTS2 CDMA System Time 416 and the MS CDMA System Time of the reverse link signal as measured at the receiver of BTS2. The wireless network uses the new ΔTE to update the Neighbor List messages subsequently transmitted by BTS1 and BTS2.

Figure 5:
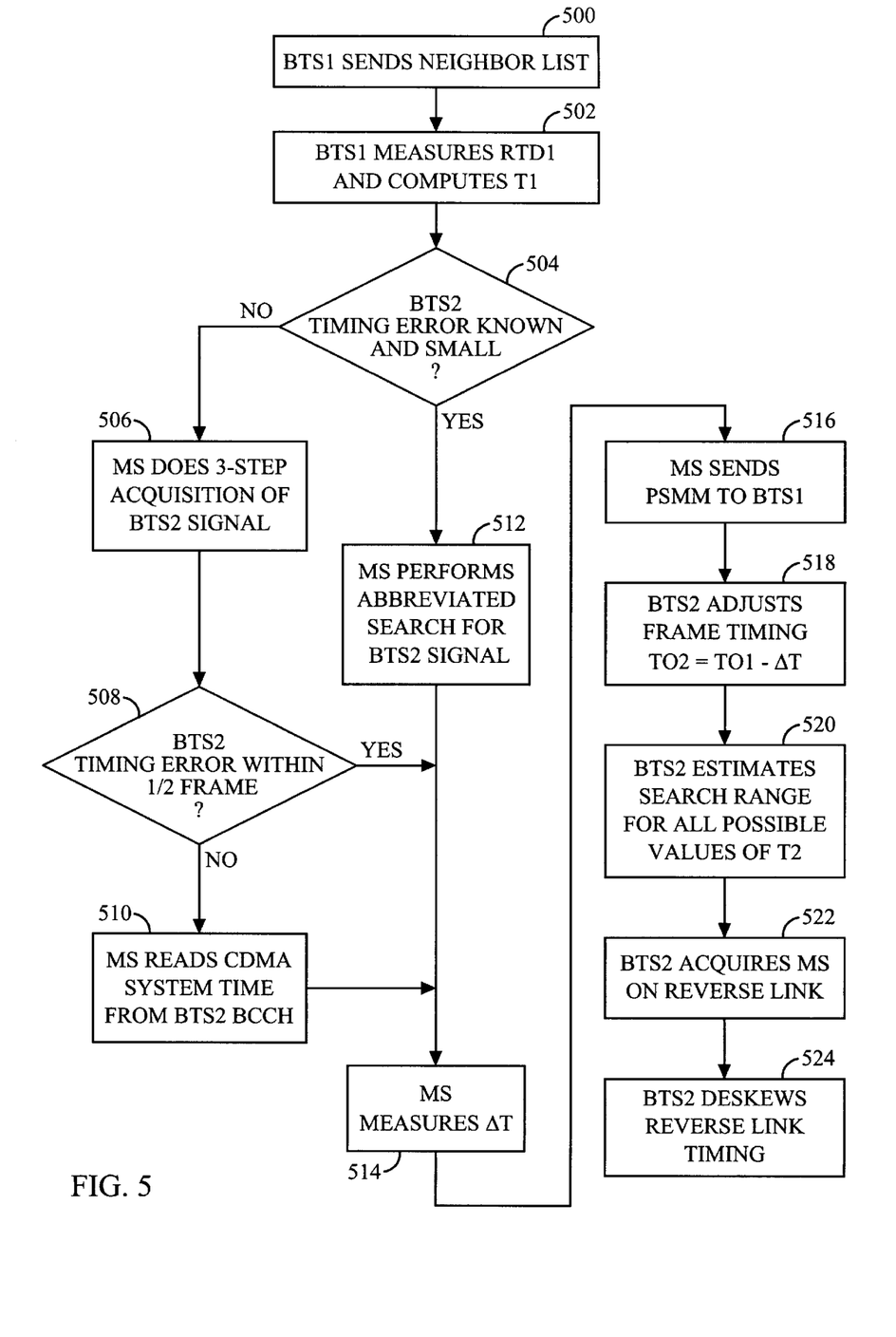
FIG. 5 is a flowchart showing the steps of an exemplary method of establishing handoff of a mobile station from a serving base station to an asynchronous target base station.

FIG. 5 is a flowchart showing the steps of an exemplary method of establishing handoff of a mobile station from a serving base station (BTS1) to an asynchronous target base station (BTS2). At step 500, BTS1 sends a Neighbor List to the MS. In an exemplary embodiment, the Neighbor List is sent by BTS1 in one or more broadcast messages. The Neighbor List includes forward link characteristics for each neighbor base station such as pilot code, estimated timing error, and expected accuracy of the estimated timing error.

At step 502, BTS1 measures RTD1 (406 in FIG. 4) to determine T1 (404 in FIG. 4). At step 504, the MS evaluates the expected accuracy of the estimated timing error associated with BTS2. If the estimated timing error is known to be accurate, then at step 512 the MS performs an abbreviated search for the forward link signal of BTS2. In an exemplary embodiment, the MS searches for the pilot code of BTS2 within a search window based on the inaccuracy of the ΔTE estimate and the path delay uncertainty of the system. In an alternate embodiment, the MS searches for primary synchronization code of BTS2 within the search window. In another alternate embodiment, the MS searches for secondary synchronization code of BTS2 within the search window.

If the estimated timing error for BTS2 is not accurately known, then at step 506, the MS performs a three-step PERCH acquisition procedure to acquire the forward link signal of BTS2. At step 508, the MS evaluates whether BTS2 CDMA System Time can be unambiguously determined from the PERCH channel timing. If not, then at step 510 the MS reads the BCCH signal to determine BTS2 CDMA System Time. The evaluation at step 508 may be performed prior to step 506, in which case the three-step PERCH acquisition procedure and decoding the BCCH signal may be done simultaneously.

After performing step 510 or 512, or if BTS2 CDMA System Time is unambiguously determined at step 508, the MS measures the timing error of BTS2 in relation to BTS1 at step 514. At step 516, the MS sends information indicating the BTS2 timing error within a Pilot Strength Measurement Message PSMM) to serving base station BTS1. The wireless network uses this timing error information to update the timing error sent to mobile stations in subsequent Neighbor List messages.

In an exemplary embodiment, at step 518, BTS2 begins transmitting forward link frames to the MS at an offset TO2 (420 in FIG. 4). TO2 is calculated as described above. The wireless network can send a handoff direction message to the MS either before BTS2 begins transmitting or after BTS2 begins transmitting. If the handoff direction message is sent after BTS2 begins transmitting, then the handoff direction message is preferably transmitted from both BTS1 and BTS2. At step 520, BTS2 searches for the reverse link signal of the MS over an estimated search window. The width of the estimated search window is based on the path delay uncertainty. The location of the estimated search window is based on the measured RTD1 (406 in FIG. 4).

At step 522, BTS2 acquires the reverse link signal transmitted by the MS. Then, at step 524, BTS2 adjusts (deskews) its reverse link demodulation timing according to the actual arrival time of reverse link signals from the MS.

Figure 6:
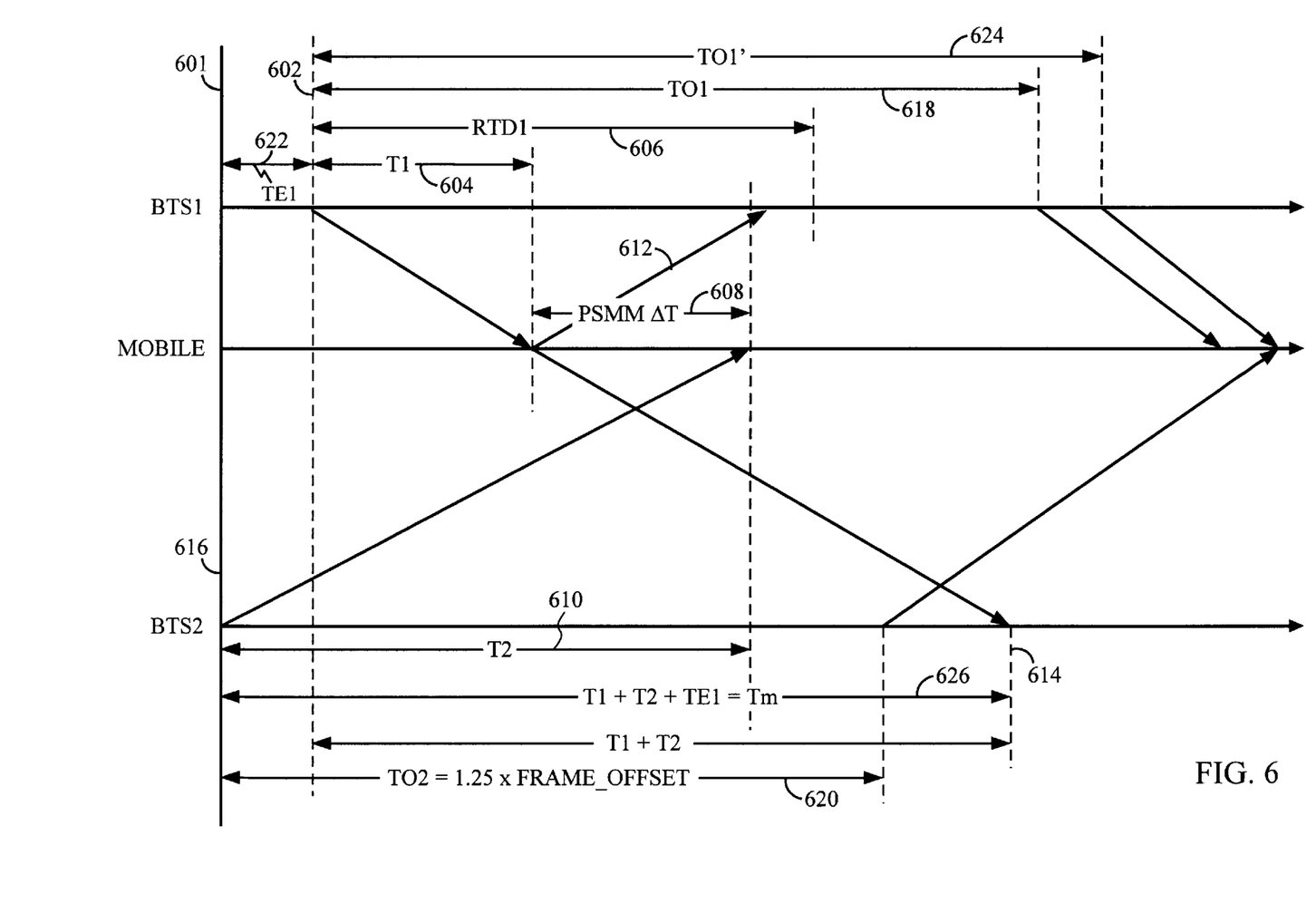
FIG. 6 is a diagram showing the timing associated with performing handoff of a mobile station from an asynchronous serving base station to a synchronous target base station.

FIG. 6 is a diagram showing the timing associated with performing handoff of a mobile station (MS) from an asynchronous serving base station (BTS1) to a synchronous target base station (BTS2). The handoff may be a hard handoff or a soft handoff. Though only one serving base station is shown, an MS may communicate with multiple serving and base stations in soft handoff and may perform handoff to multiple target base stations.

In FIG. 6, the CDMA System Time used by BTS1 is shown as offset from a universal time reference 601. BTS2 is a synchronous base station and is therefore synchronized to the universal time reference 601. BTS1 CDMA System Time is offset from universal time reference 601 by a timing error TE1 622. BTS2 CDMA System Time is equal to the universal time reference. The timing error of BTS2 in relation to BTS1 is equal to TE1.

In an exemplary embodiment, timing information gathered during handoffs is used to maintain an estimate of TE1 622. Because of drift in the oscillators in asynchronous base station BTS1, estimates of the timing error between BTS1 and BTS2 can be expected to grow less accurate in the period following a measurement during handoff. In other words, as more time passes after TE1 622 is measured in a handoff, the estimate of TE1 622 can be expected to grow less reliable.

After a call is established between a mobile station (MS) and the serving base station (BTS1), the mobile station establishes an MS CDMA System Time based on timing information received from BTS1. Because of the propagation delay in the forward link channel from BTS1 to the MS, the MS CDMA System Time used by the MS will lag behind BTS1 CDMA System Time. The lag time between the MS CDMA System Time and BTS1 CDMA System Time is equal to the one-way propagation delay in the signal (T1) 604. BTS1 measures the round-trip delay time (RTD1) 606 between BTS1 and the MS as described above.

When the MS sends a time-stamped signal 612 to BTS1, BTS1 measures the arrival time of the MS information according to BTS1 CDMA System Time. Using this timing information, BTS1 determines the round-trip-delay time (RTD1) 606 between BTS1 and the MS. Once RTD1 606 is known, then T1 604 is known to be half of RTD1 606.

In an exemplary embodiment, the serving base station (BTS1) sends a Neighbor List to the MS. The Neighbor List includes identifying characteristics of the forward link signal of each neighbor base station. For a synchronous neighbor base station such as BTS2, the Neighbor List includes such information as an estimated pilot offset and the expected accuracy of the estimated pilot offset. The Neighbor List may also include path delay uncertainty information.

If the pilot offset for BTS2 in the Neighbor List is known to be accurate, the MS searches for the pilot signal from BTS2 using a search window based on the expected pilot offset inaccuracy. For example, if the inaccuracy of the ΔTE estimate is less than half of the time offset between the next-closest pilot offset of a synchronous neighbor base station, then the MS can search for the pilot signal of BTS2 within a search window based on the inaccuracy of the pilot offset estimate. The MS may additionally use the path delay uncertainty of the system to determine the search window width. In an exemplary embodiment, the PN offsets of the synchronous neighbor base stations of an asynchronous base station are spaced far apart from each other in order to allow unambiguous identification of synchronous base station pilots using wide search windows.

If the inaccuracy of the pilot offset estimate for BTS2 is large, then the MS searches for the BTS2 pilot over the entire pilot code search range of 26.67 milliseconds. After acquiring one or more pilot signals, the MS reads the sync channel associated with one of the pilot signals to obtain an estimate of CDMA System Time that is synchronized to a universal time reference. Once CDMA System Time is obtained from any synchronous base station, the MS can unambiguously determine the pilot offsets of any other pilot signals received from other synchronous base stations. The MS then measures the difference between CDMA System Time received from BTS1 and BTS2 (shown as ΔT 608). In an exemplary embodiment, the MS then sends a Pilot Strength Measurement Message (PSMM) to the serving base station (BTS1). Information in the PSMM indicates the strength of the signal received by the MS from BTS2 and ΔT 608.

Because the TE1 622 is only known to within the path delay uncertainty of the system, the one-way propagation delay from BTS2 to the MS (T2) 610 can only be estimated from T1 604 and ΔT 608. However, an offset TO2 620 can be accurately determined that would enable BTS2 to transmit forward link frames such that they arrive at the MS at approximately the same time as frames transmitted from BTS1.

In an exemplary embodiment, a synchronous target base station BTS2 can only adjust the forward link frame offset TO2 620 in increments of 1.25 milliseconds. In order to establish a handoff from an asynchronous serving base station BTS1 to a synchronous target base station BTS2, it is generally necessary to adjust the transmit timing of both the serving and target base stations so that frames from both base stations arrive at the MS at nearly the same time. In an exemplary embodiment, BTS2 chooses its frame offset in order to minimize the size of the timing adjustment that BTS1 must make. In other words, since TO2 620 can only be adjusted in steps of 1.25 milliseconds, a value of TO2 620 is chosen such that minimal change to TO1 618 will be required to synchronize forward link transmissions. TO2 620 is chosen to minimize |TO2−TO1−ΔT|, where TO1 618 is the forward link frame offset used by BTS1, TO2 620 is the forward link frame offset used by BTS2, and ΔT is the time offset 608 between BTS1 CDMA System Time and BTS2 CDMA System Time measured at the MS. After TO2 620 is chosen for BTS2, then a modified TO1' 624 is determined that will minimize |TO2−TO1−ΔT| to within a Walsh symbol (15.6 microseconds at 4.096 megachips-per-second). BTS1 then adjusts its transmit frame offset from the old TO1 618 to the modified TO1' 624. BTS2 transmits forward link frames to the MS at offset TO2.

In an exemplary embodiment, the MS begins demodulating the forward link signal from BTS2 after receiving a handoff direction message from BTS1. The order in which TO1 and TO2 are adjusted and the time that the handoff direction message is transmitted may be varied without departing from the described method.

Because the T2 610 is not accurately known, the time that reverse link frames transmitted by the MS will arrive at BTS2 can only be approximated. In order to acquire the reverse link signal from the MS, BTS2 searches for the reverse link signal of the MS within an estimated search window. The width of the estimated search window is based on the path delay uncertainty. The location of the estimated search window is based on the measured RTD1 606.

As described above, the MS transmits its reverse link signals using a PN phase that is aligned with MS CDMA System Time. Once BTS2 acquires the reverse link signal from the MS, BTS2 measures the difference Tm 626 between BTS2 CDMA System Time 616 and the MS CDMA System Time of the reverse link signal as measured at the receiver of BTS2 614. The wireless network can then determine the timing error TE1 622 of BTS1 CDMA System Time 402 according to the equation:

$$TE1 = \frac{Tm - \Delta T}{2} - T1$$

where TE1 622 is the timing error of BTS1 CDMA System Time 402, Tm 626 is the difference between BTS2 CDMA System Time 616 and the MS CDMA System Time of the reverse link signal as measured at the receiver of BTS2 614, ΔT is the time offset 608 between BTS1 CDMA System Time and BTS2 CDMA System Time measured at the MS, and T1 604 is the one-way propagation delay from BTS1 to the MS. The wireless network uses the new ΔTE to update the Neighbor List messages subsequently transmitted by BTS1 and BTS2.

Figure 7:
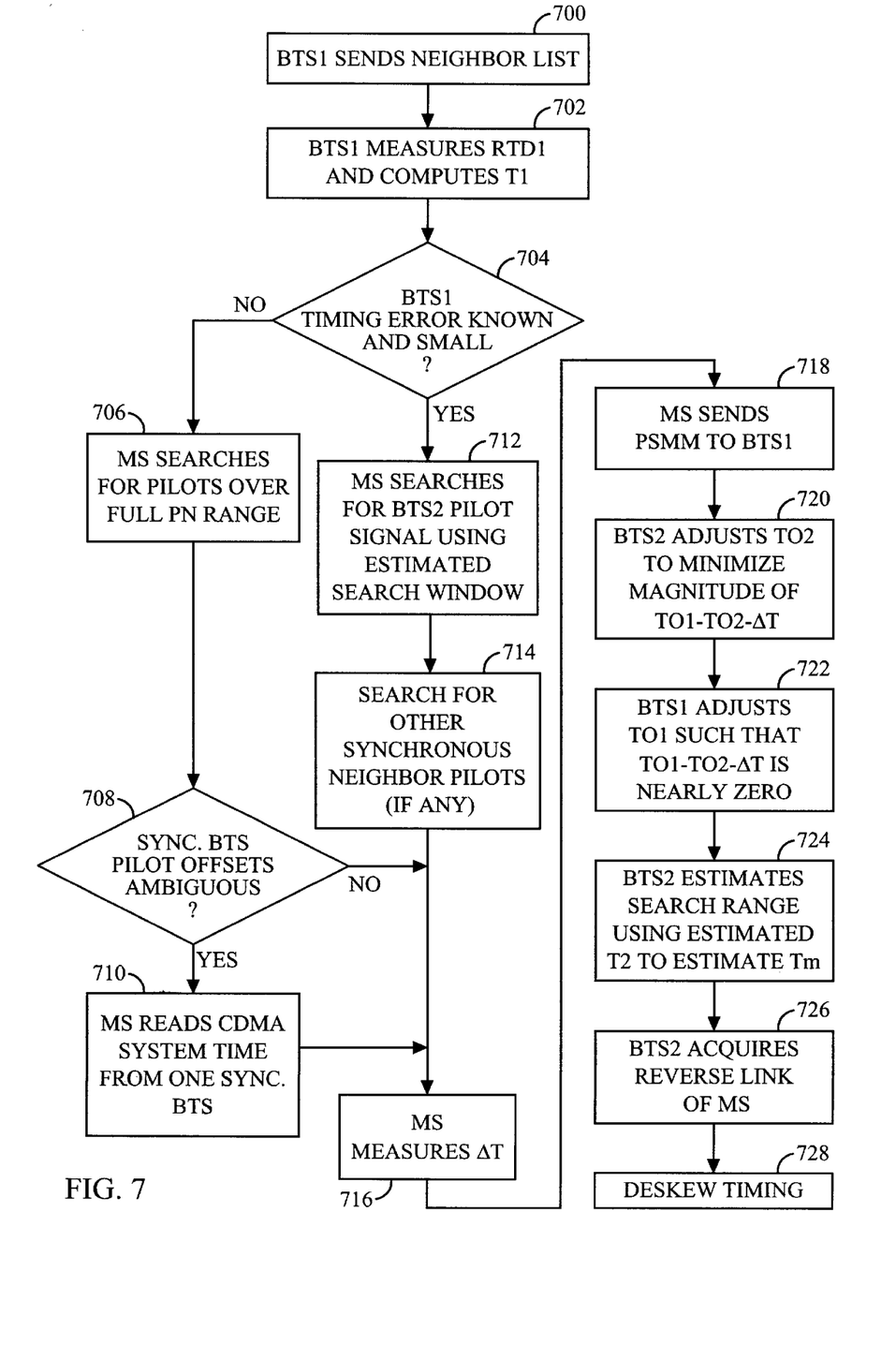
FIG. 7 is a flowchart showing the steps of an exemplary method of establishing handoff of a mobile station from an asynchronous serving base station to a synchronous target base station.

FIG. 7 is a flowchart showing the steps of an exemplary method of establishing handoff of a mobile station from an asynchronous serving base station (BTS1) to a synchronous target base station (BTS2). At step 700, BTS1 sends a Neighbor List to the MS. The Neighbor List includes forward link characteristics for each neighbor base station such as an estimated pilot offset and the expected accuracy of the estimated pilot offset.

At step 702, BTS1 measures RTD1 (606 in FIG. 4) to determine T1 (604 in FIG. 6). At step 704, the MS evaluates the expected accuracy of the BTS2 pilot offset based on information received in the Neighbor List. If the PN offset of BTS2 is accurately known, then, at step 712, the MS searches for the pilot signal of BTS2 within an estimated search window. The width of the estimated search window is based on the inaccuracy of the PN offset estimate. After acquiring one pilot signal from a synchronous base station at step 712, the MS has an accurate estimate of CDMA System Time for any synchronous base station. At step 714, the MS uses this synchronous base station timing information to efficiently search for the pilot signals of any other synchronous base stations in the Neighbor List.

If the MS cannot accurately determine the pilot offset of BTS2, then at step 706, the MS searches for the BTS2 pilot over the entire pilot code search range of 26.67 milliseconds. At step 708, the MS evaluates whether the pilot signals acquired can be unambiguously identified. If the PN offsets of the pilot signals are spaced far apart compared to the inaccuracy of the pilot offset estimates in the Neighbor List, then the pilot signals may be uniquely identified after the full PN search at step 706. If the PN offsets of the acquired pilot signals cannot be uniquely identified, or if the CDMA System Time of a synchronous base station cannot be determined, then at step 710, the MS reads CDMA system time from the sync channel of a synchronous base station.

After performing step 710 or 714, or if BTS2 CDMA System Time is unambiguously determined at step 708, then at step 716 the MS measures the timing error of BTS2 in relation to BTS1. At step 718, the MS sends information indicating the BTS2 timing error within a Pilot Strength Measurement Message (PSMM) to serving base station BTS1. The wireless network uses this timing error information to update information about the timing error between BTS1 and BTS2 sent to mobile stations in subsequent Neighbor List messages.

In an exemplary embodiment, at step 720, BTS2 begins transmitting forward link frames to the MS at an offset TO2 (620 in FIG. 6). TO2 (620 in FIG. 6) is calculated as described above. In an alternate embodiment, BTS2 does not begin transmitting forward link frames to the MS until after step 722, in which BTS1 adjusts its frame offset value from TO1 (618 in FIG. 6) to TO1' (624 in FIG. 6) as described above. At step 724, BTS2 searches for the reverse link signal of the MS over an estimated search window. The width of the estimated search window is based on the path delay uncertainty. The location of the estimated search window is based on the measured RTD1 (606 in FIG. 6).

At step 726, BTS2 acquires the reverse link signal transmitted by the MS. Then, at step 728, BTS2 adjusts (deskews) its reverse link demodulation timing according to the actual arrival time of reverse link signals from the MS.

Figure 8:
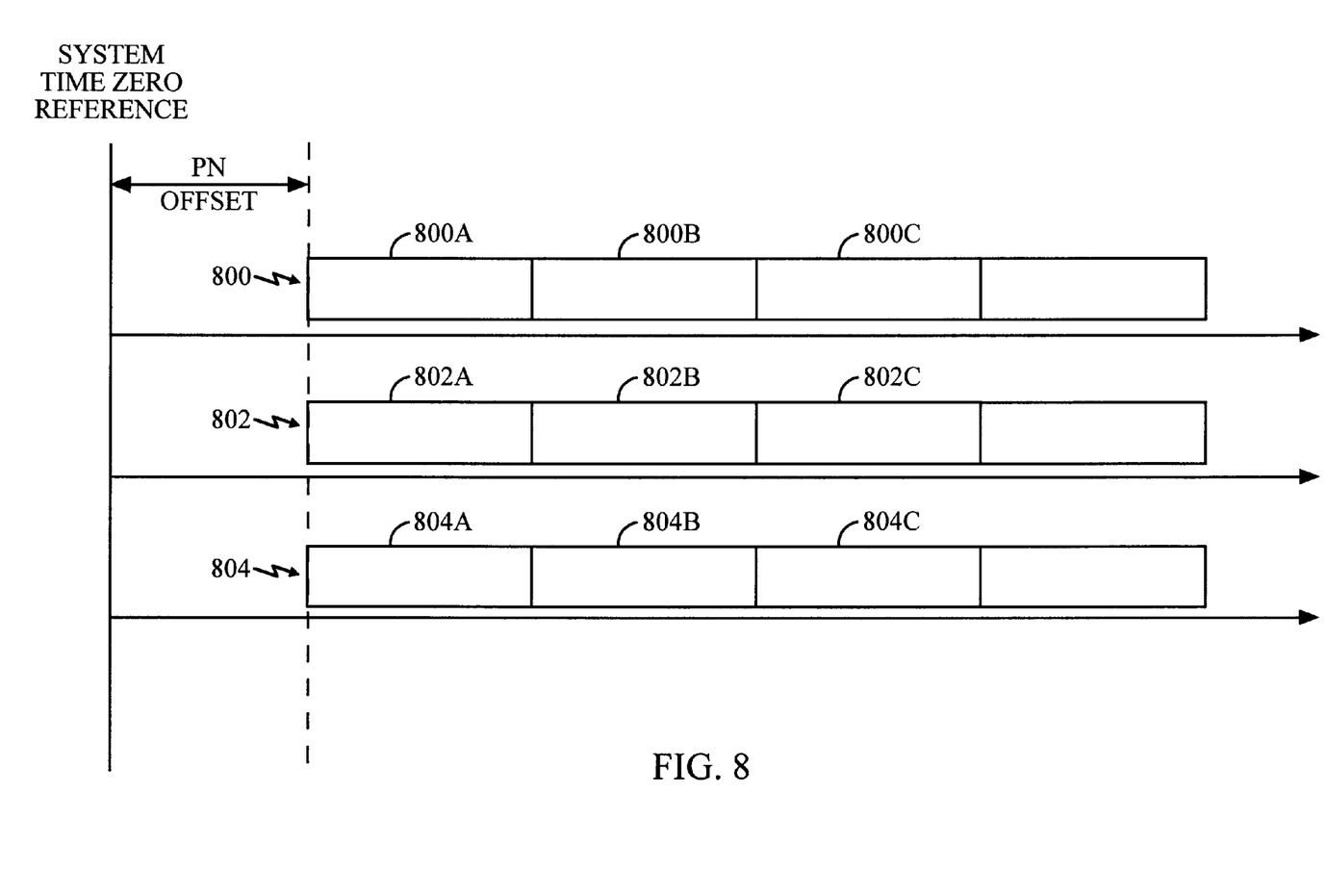
FIG. 8 is a simplified timing diagram of a short sync channel structure transmitted by synchronous base stations in accordance with an embodiment.

FIG. 8 is a diagram of an advantageous "short sync channel" signal structure that allows faster determination of CDMA System Time from a synchronous base station. Three separate forward link channels are shown, a pilot channel 800, a sync channel 802, and an identification (ID) channel 804. Pilot channel 800 may be a conventional pilot channel according to IS-95. Pilot channel 800 is transmitted by synchronous base stations at different PN offsets from the system time zero reference. For convenience of illustration, pilot channel 800 may be broken down into a continuous repetition of frames 800A, 800B, 800C. Sync channel 802 may be a conventional synchronization channel according to IS-95. Sync channel 802 is transmitted with the beginning of a sync channel frame being time-aligned with the pilot channel 800, according to the same PN offset. For convenience of illustration, sync channel 802 may be broken down into a continuous repetition of frames 802A, 802B, 802C.

ID channel 804 is also shown in FIG. 3 as being time-aligned with the PN offset of the pilot channel 800. However, ID channel 804 is not a conventional IS-95 channel. Advantageously, ID channel 804 is transmitted by synchronous base stations in addition to the conventional pilot channel 800 and conventional sync channel 802. ID channel 804 is also advantageously covered with a different Walsh code than pilot channel 800 or sync channel 802 in order to maintain orthogonality of the forward channels. However, it is understood that the ID channel 804 does not necessarily need to be orthogonal to the remaining overhead channels. For convenience of illustration, ID channel 804 may be broken down into a continuous repetition of frames 804A, 804B, 804C which are aligned in time with the PN sequence of the pilot channel 800.

The ID channel 804 is used to improve handoffs from asynchronous base stations to synchronous base stations. In particular, the ID channel 804 aids a mobile station in determining the pilot PN offset, and therefore the identity and timing of the target synchronous base station to which it is handing off. As described above, the conventional sync channel 802 contains a large amount of information in addition to the pilot PN offset of the transmitting base station. None of this additional information is as immediately critical to the mobile station during handoff from an asynchronous base station to a synchronous base station as the pilot PN offset. Thus, in the embodiment of FIG. 3, ID channel 804 contains as little information as necessary for the base station to rapidly determine the pilot PN offset of the transmitting base station. For example, in one embodiment, the ID channel 804 contains at least the 9-bit pilot PN offset. The ID channel 804 may also contain the 2-bit phase of the pilot PN sequence in 80 ms, and also a 1-bit even/odd indication of the 80 ms epoch of the pilot PN sequence. These additional fields allow the mobile station to determine the PN long code state. With this information, the mobile station can derive system time and synchronize to the transmitting base station's timing.

In the exemplary embodiment, the ID channel 804 is Golay encoded. For example, in the embodiment that has 12 bits (9 pilot PN offset, plus 2 phase, plus 1 even/odd), the ID channel 804 uses a 24 bit (24, 12) Golay code word. Golay codes are well known in the art as being robust, efficient error correcting codes and will not be discussed in detail herein. Example Golay coding and decoding techniques are given in the book "Error Control Coding: Fundamentals and Applications", by Shu Lin and Daniel J. Costello, Jr., ISBN 0-13-283796-X. However, other error-correcting coding techniques such as convolutional encoding or other techniques well known in the art may be used for the ID channel 804 without departing from the present invention.

Each ID channel frame 804A, 804B, 804C may contain one or more code words with each code word containing the pilot PN offset, and optionally the other information described above. The ID channel 804 advantageously is continuously repeated. The continuous repetition allows a mobile station that did not collect sufficient energy during the duration of a single code word to combine energy from multiple consecutive code words in order to decode the code word and recover the pilot PN offset. In one embodiment, only those synchronous base stations that have at least one asynchronous base station as a neighbor would transmit the ID channel 804.

In an alternate embodiment, the advantageous short sync channel structure described above is used in synchronous base stations to facilitate handoff from asynchronous to synchronous base stations. For example, in FIG. 7, the MS at step 710 reads CDMA System Time using the short sync channel techniques described above.

The previous description of the preferred embodiments is provided to enable any person skilled in the art to make or use the present invention. The various modifications to these embodiments will be readily apparent to those skilled in the art, and the generic principles defined herein may be applied to other embodiments without the use of the inventive faculty. Thus, the present invention is not intended to be limited to the embodiments shown herein but is to be accorded the widest scope consistent with the principles and novel features disclosed herein.

We claim:

1. A method for establishing a handoff of a wireless mobile station from a serving base station to an asynchronous target base station comprising the steps of:

evaluating a timing error associated with the asynchronous target base station;

estimating a search window for use in searching for an asynchronous pilot code based on said timing error; and searching for the asynchronous pilot code within said search window.

2. The method of claim 1 further comprising the steps of:

searching for a primary synchronization code based on said timing error exceeding a first predetermined value, wherein said primary synchronization code is transmitted by the asynchronous target base station; and searching for a secondary synchronization code based on said timing error exceeding a first predetermined value, wherein said secondary synchronization code is transmitted by the asynchronous target base station.

3. The method of claim 2 further comprising the step of determining a CDMA System Time from a forward link signal transmitted by the asynchronous target base station.

4. The method of claim 2 further comprising the step of determining a forward frame number from a forward link signal transmitted by the asynchronous target base station.

5. A method for establishing a handoff of a wireless mobile station from an asynchronous serving base station to a synchronous target base station comprising the steps of:

evaluating a timing error associated with the asynchronous serving base station and the synchronous target base station;

estimating a search window for use in searching for a synchronous pilot pseudonumber (PN) signal based on said timing error; and searching for the pilot PN signal within said search window.

6. A method for establishing a handoff in a wireless network comprising an asynchronous serving base station and a synchronous target base station, the method comprising the steps of:

receiving a message from a first wireless mobile station indicating a first system time associated with the asynchronous serving base station and indicating a second system time associated with the synchronous target base station;

generating, based on said first system time and said second system time a timing error value; and sending a neighbor list to a wireless mobile station, the neighbor list comprising the timing error value.

7. A method for establishing a handoff of a wireless mobile station from a serving base station to an asynchronous target base station comprising the steps of:

evaluating a timing error associated with the asynchronous target base station;

estimating a search window for use in searching for an asynchronous pilot code based on said timing error; and searching for the asynchronous pilot code within said search window.

* * * * *